Figure 1:
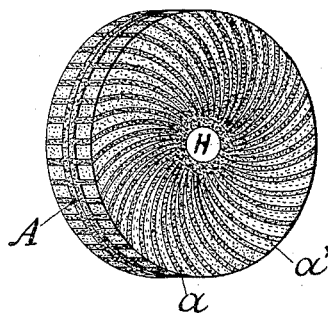

(No Model.) 2 Sheets—Sheet 1.

R. W. HARDIE.
EMERY WHEEL.

No. 409,837. Patented Aug. 27, 1889.

WITNESSES:
Chas Hanimann
Walter Nulin

INVENTOR
Robert W. Hardie (No Model.) 2 Sheets—Sheet 2.

R. W. HARDIE.
EMERY WHEEL.

No. 409,837. Patented Aug. 27, 1889.

WITNESSES:
Chas Hanimann
Walter Melins

INVENTOR
Robert W. Hardie.

UNITED STATES PATENT OFFICE.

ROBERT W. HARDIE, OF ALBANY, NEW YORK.

EMERY-WHEEL.

SPECIFICATION forming part of Letters Patent No. 409,837, dated August 27, 1889.

Application filed September 6, 1888. Serial No. 284,759. (No model.)

*To all whom it may concern:*

Be it known that I, ROBERT W. HARDIE, a citizen of the United States, and a resident of Albany, in the county of Albany and State of New York, have invented certain new and useful Improvements in Emery-Wheels, of which the following is a specification.

My invention relates to the general construction and composition of emery-wheels, and has for its objects, first, to construct an emery-wheel the periphery of which will not glaze or become smooth when in use; second, to construct an emery-wheel which will be enduring, and which will at the same time have a free and quick cutting-periphery; third, to so construct an emery-wheel portions of which have a soft bond or medium for binding the emery together that the emery will not be easily torn from the bond or medium by the pressure of the work upon the wheel; fourth, to so construct an emery-wheel that it will have a quick cutting-periphery without leaving coarse scratches in the work. These objects I accomplish, first, by providing an emery-wheel with two or more series of sections extending from the central portion of the wheel to the periphery, the sections of one series being arranged alternately with the sections of another series; second, by providing an emery-wheel with two or more series of sections, in some of which series the bond or medium for holding the emery together will be harder than in others, and by so arranging the harder sections that they will protect the softer sections and prevent the work from being pressed too heavily upon the softer sections and from tearing the softer sections apart before the wearing properties of the emery therein have become worn out or exhausted; third, by providing an emery-wheel with series of sections in the shape of ribs extending from the center to the circumference of the wheel, so as to form cutting-teeth on the periphery; fourth, by providing and extending such ribs to the circumference or periphery of the wheel in a curved line, so that their extremities will have a beveled or chisel-shaped edge extending part way or entirely across the periphery of the wheel; fifth, by providing an emery-wheel with disks of uniform composition throughout, in combination with series of sections, some of which may be of the same composition as the disk and some of a different composition, said sections extending from the central portion of the wheel to the circumference and having their ends extending part way across the periphery; sixth, by providing the different series of sections of such a wheel with the same bond or medium for holding the emery together, but with different grinding materials in one series from that in the other.

Figure 2:
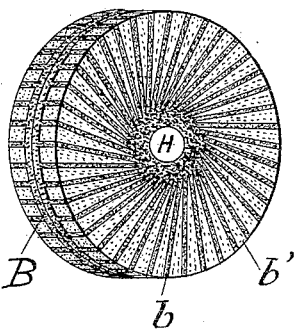
Figure 3:
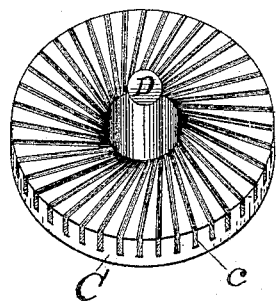
Figure 4:
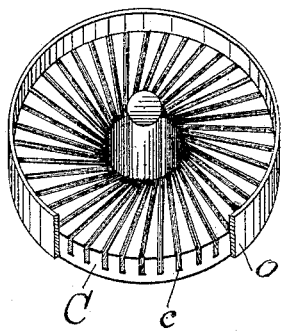
Figure 5:
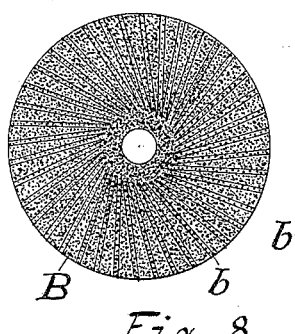
Figures 6, 7:
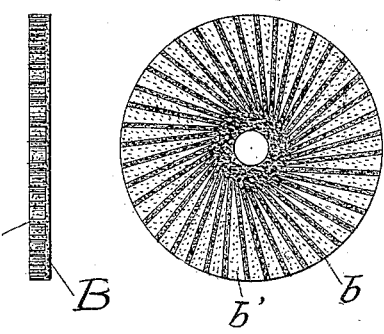
Figure 8:
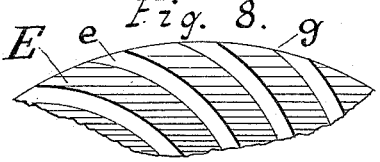
Figure 9:
Figure 10:
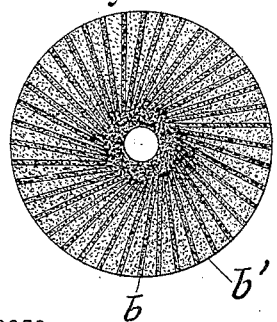
Figures 11, 12:
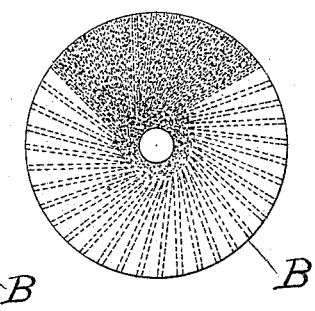
Figure 13:
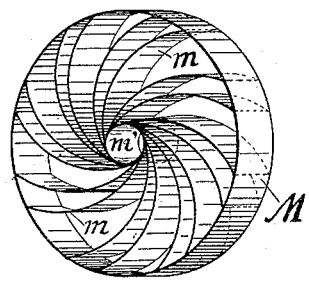
Figure 14:
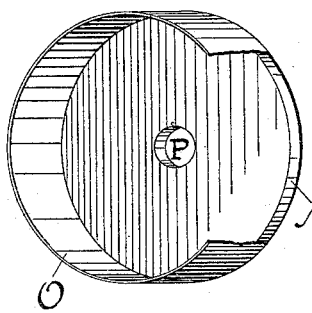
Figure 15:
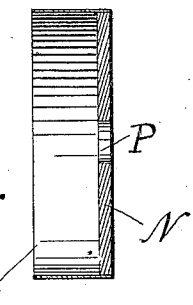
Figure 16:
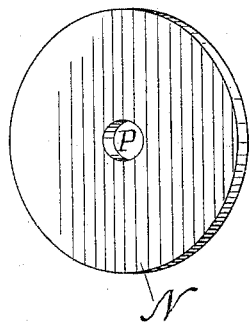
Figure 17:
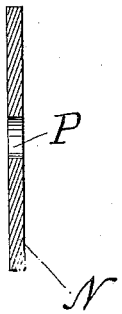
Figure 18:
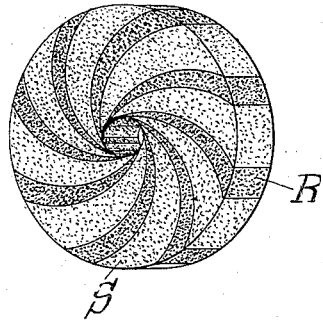

In the drawings, Figure 1 represents a wheel having a central disk of uniform composition throughout and having two series of sections on each side of the disk, the sections extending from the central portion of the wheel to the periphery in a curved line. Fig. 2 represents a wheel of the same general construction as that shown in Fig. 1, but having the sections on the sides of the disk extending from the center to the circumference of the wheel in a straight line. Fig. 3 represents a circular mold-plate and a pin, both adapted to be used in the construction of a wheel similar to that shown in Fig. 2. Fig. 4 represents a circular band surrounding the mold-plate. Fig. 5 represents a portion of an emery-wheel after it has passed through one of the stages of the process of construction. Fig. 6 shows an edge view of the portion of the wheel shown in Fig. 5. Fig. 7 shows a side view of a disk of uniform composition throughout, in combination with two series of sections of different composition arranged alternately on the side of the disk, one series of sections being similar in composition to the circular disk. Fig. 8 represents a side view of a portion of a wheel, showing in enlarged view the beveled edges of the sections extending to the circumference of the wheel, similar to those shown in Fig. 1. Fig. 9 represents an edge view of a wheel constructed of two disks or wheels similar to that shown in Fig. 7. The disks of uniform composition in each are placed together, forming one unbroken disk of uniform composition of double the thickness of the disk shown in Fig. 7. Fig. 10 represents a side view of the wheel shown in Fig. 9. Fig. 11 represents an edge view of a wheel constructed of two wheels, each similar to that shown in Fig. 7, the disks of uniform composition being on the outside of the wheel. Fig. 12 represents a side view of a wheel constructed as shown in Fig. 11, the dotted radial lines indicating the position occupied by the series of sections placed between the outer disks. Fig. 13 represents a form or mold consisting of a circular band or rim connected with a circular band or rim in the center by means of bands extending from one circular band to the other in a curved line. Fig. 14 represents a flat circular plate surrounded by a band or flange, a part of which is broken away, exposing part of the periphery of the circular plate. Fig. 15 represents a vertical cross-section of the parts shown in Fig. 14. Fig. 16 represents a perspective view of the circular plate shown in Fig. 14. Fig. 17 represents a vertical cross-section of the same. Fig. 18 represents a wheel constructed of two series of sections, the sections of each series being arranged alternately, each section extending from the central portion of the wheel to the circumference and from one side of the wheel to the other.

Emery-wheels are designated by the kind and quantity of chemicals or materials used to bind the emery together, as "soft wheels," "hard wheels," and "medium wheels." A hard wheel is a wheel in which the material used as a bond or medium to bind the emery together is of a strong and hard nature when the wheel is completed and ready for use. A soft wheel is known as a wheel wherein the bond or medium which holds the particles of emery together is of a soft or weak nature when the wheel is perfected and ready for use, in consequence of which the particles of emery are more easily detached from the bond or medium when the wheel is in use. A wheel having a bond or medium the quality or strength of which is midway between the two already described is sometimes called a "medium wheel." These conditions of strength or weakness may arise either from the nature of the substance or chemicals used or from the action or processes to which the wheel is subjected in order to harden it. These terms are used without reference to the size of the particles of emery of which the wheel is composed. A wheel wherein the particles of emery are coarse is called a "coarse wheel." When the particles are fine or small, the wheel is called a "fine wheel." When they cannot be called "fine" or "coarse," the wheel is called a "medium wheel."

In this specification the term "uniform composition" is used by me to signify that a portion of a wheel or the different sections of a series have the same bond or medium for holding the emery together. The term "similar in composition" is used to signify that the sections composing a series have the same bond or medium for holding the emery together, or that the size of the emery used in each section of a series is substantially the same. The term "different in composition" or "differing in composition" is used to signify that the sections composing one series have a harder or softer bond or medium, or different grinding materials, or different size grains of grinding materials from that of the sections of another series, or that they differ in respect to two or more of these conditions. The term "composition," therefore, is used to describe the bond or medium or the size of emery or the grinding materials used.

In this application I do not claim or desire to patent the process of molding or forming emery-wheels similar to those shown herein.

Wheels of the general character shown herein may be constructed or formed by different processes. A molding-board C is provided having a series of grooves c, extending from the central portion of the board to the periphery in a straight line, as shown in Fig. 3, or they may be extended in a curved line. The mold-board is then placed within a circular flange or rim O, and a pin D inserted in a hole in the central portion of the mold-board. The emery, mixed with some adhesive substance or medium designed to hold the particles of emery together, is then laid upon this board, filling the grooves and making on the surface of the board a disk of emery somewhat thicker than the disk which it is desired to construct. A follower-plate N, having a hole in the center adapted to allow the pin D to pass through, is then placed upon the top of the layer of emery in the mold and pressed down upon the emery. The entire mold, with the body of emery, is then turned over bodily and the mold-plate C raised out of the circular rim O. A disk of emery of uniform composition, (represented by B in Fig. 5,) having a series of sections $b$, extending across the surface from the central portion to the periphery, will then be left upon the follower-plate N. These sections will correspond in general shape to the grooves in the mold-plate C and be similar in composition to the disk B. When it is desired to extend the sections in a curved line to the periphery, the grooves in the plate should be made curved from the center outward. The spaces between the sections $b$ may then be filled with emery of any size or having any bond or medium for holding it together, or with a different grinding material, such as corundum. A series of sections $b'$ will then be formed. The material may be then leveled off even with the top of the sections $b$, so that the sections of both series will have substantially the same height. An emery-wheel will then have been formed having a disk of uniform composition and two series of sections differing in composition from each other, the sections of each series arranged alternately in the same plane, a side view of which is shown in Fig. 7. Another wheel may then be made in the same manner as that already described. These two wheels may then be placed together, so that the disks of uniform composition will coincide, making a double disk of uniform composition through the center of the wheel, as shown in Fig. 9, or the two wheels may be placed together, so that the disks of uniform composition shall form the outsides of the wheel, and the sections of one wheel will coincide with the sections of similar composition in the other wheel, as shown by Fig. 11. The radial dotted lines in Fig. 12 indicate the position occupied by the sections placed between the two disks.

Another mode of making such a wheel, and the one which I prefer for simplicity and quickness, is to use a form or mold similar to that shown in Fig. 13. A circular plate N is placed within a circular mold or flange O, and the form M placed upon said plate within the mold or flange O. A pin similar to that shown by D in Fig. 3 is then inserted in the circular ring $m'$ of the form M. The form M is provided with a band secured to the outer ends of the partitions, which is designed to prevent the partitions from spreading apart. Emery of any size suitable for the work upon which the wheel is to be used is mixed with some adhesive substance, designed to be used as a bond or medium for holding the emery together, and placed in every other one of the compartments formed by the partitions $m$. Emery with a different bond or different grinding material is then placed in the other compartments. The emery is then leveled off even with the top of the partitions $m$, and the form M is then raised out of the mold or flange O. A circular plate N, similar to that placed in the bottom of the mold, is then placed upon the top of the body of emery and pressed or pounded down upon the body of emery, so as to make the mass more compact. The mold O serves as a chamber to confine the plastic mass of emery after the form has been removed and while the emery is being pounded or pressed into a compact body. When it is desired to have these sections extend in a straight line from the center of the wheel to the periphery, the partitions $m$ in the mold M should be made straight instead of curved, or they may be constructed in any shape desired to correspond with the shape desired for the different sections. The wheel when it leaves the mold is ready to be subjected to the heating process. If it is desired to construct a wheel similar to that shown in Fig. 11, this process may be used, and after a wheel similar to that shown in Fig. 18 has been formed in the manner described, thin disks or wheels may be molded in any of the ways now well known to the trade, and the disks when formed may be placed on each side of the wheel shown in Fig. 18. The result will be a wheel constructed substantially like that shown in Fig. 11.

When it is desired to construct a wheel having the general shape of the wheel shown in Figs. 9 and 10, a flat circular disk of uniform composition may be formed, and two sections or two wheels similar to that shown in Fig. 18 may be formed, and one of those wheels placed on each side of the disk. The result will be a central disk of uniform composition, similar to that shown in Fig. 9, having on each side a disk or wheel similar to that shown in Fig. 18.

I do not desire to be limited to the specific form or arrangement of the different sections or parts composing a wheel of the general nature shown herein. All of the parts may be varied in form or composition without departing from the general principles of my invention.

When work to be ground is pressed against the edge of a wheel constructed on the principles herein shown, the hard portions, whether they consist of a central disk and alternate cross-sections, or whether they consist simply of alternate sections surrounding or following the softer sections, will hold the work back and prevent it from being pressed too heavily against the softer sections. The soft portions of the wheel will then cut the work freely, while the hard portions, which will not cut the work so fast as the softer portions, will lessen and prevent the tendency of such soft portions to be torn away from the bond or medium which holds the emery together. This result is produced whether the disk of uniform composition is placed in the center of the wheel, as shown in Figs. 1 and 2, or on the outside of the wheel, as shown in Fig. 11, or even when the central disk is entirely omitted, as shown in Fig. 18.

When the particles of coarse emery are torn from its bond they will be held by the work being ground, and will be rubbed against the finer portions of the wheel following the coarser portions, and thereby roughen the surface and remove any glazed spots.

I prefer to make the sections which extend from the central portions of the wheel to the periphery curved in shape, so that their ends will be beveled, whereby, when the softer portions wear away, they will leave the beveled ends of the harder sections exposed, so as to form teeth to cut and grind the work.

Another advantage to be derived from constructing the sections in a curved line is that the harder sections will serve as braces overlapping the softer portions, thus preventing them from flying apart or bursting.

A soft wheel is more apt to burst from centrifugal force than a hard wheel, so that in a wheel constructed on the principles described herein there is to be found the quick cutting qualities that are to be found in a soft wheel and the lasting and safe properties that are to be found in a hard wheel.

What I claim as new, and desire to secure by Letters Patent, is—

1. An emery-wheel having a series of sections similar in composition to each other arranged alternately with sections differing in composition from the sections of said series, substantially as shown and described.

2. An emery-wheel having a series of sections similar in composition to each other arranged alternately with sections differing in composition from the sections of said series, all of said sections extending to the periphery of the wheel in a curved line, substantially as shown and described.

3. An emery-wheel having a series of sections similar in composition to each other arranged alternately with sections differing in composition from the sections of said series, in combination with circular disks having a uniform composition throughout, substantially as shown and described.

4. An emery-wheel having a series of coarse sections similar in composition to each other arranged alternately with sections finer in composition than the sections of said series, substantially as shown and described.

5. An emery-wheel having a series of sections similar in composition to each other arranged alternately with sections differing in composition from the sections of said series, in combination with circular disks of uniform composition throughout, forming the sides of the wheel, substantially as shown and described.

ROBERT W. HARDIE.

Witnesses:
   HENRY SUTLIFF,
   EDWARD A. HACKETT.